United States Patent
Bensaad et al.

(10) Patent No.: US 12,313,504 B2
(45) Date of Patent: May 27, 2025

(54) FULLY-AUTOMATIC PORTABLE HYDROTEST SYSTEM

(71) Applicant: SAUDI ARABIAN OIL COMPANY, Dhahran (SA)

(72) Inventors: Abdullah M. Bensaad, Al Mubarraz (SA); Ridha A. Alhassan, Al Mubarraz (SA); Ali A. Aliwi, Al-Ahsa (SA); Shadi M. Al-Hazmi, Hofuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 55 days.

(21) Appl. No.: 17/810,151

(22) Filed: Jun. 30, 2022

(65) Prior Publication Data
US 2024/0003775 A1    Jan. 4, 2024

(51) Int. Cl.
*G01M 3/32*    (2006.01)

(52) U.S. Cl.
CPC ................. *G01M 3/3272* (2013.01)

(58) Field of Classification Search
CPC ................................................ G01M 3/26–34
See application file for complete search history.

(56) References Cited

U.S. PATENT DOCUMENTS

| | | | | |
|---|---|---|---|---|
| 4,599,890 A * | 7/1986 | Girone | ................ | G01M 3/26 73/49.5 |
| 11,906,479 B2 * | 2/2024 | Milholland | ........... | G01N 3/12 |
| 2009/0248324 A1 * | 10/2009 | Hamilton | ........... | G01M 3/2846 73/40 |
| 2016/0290889 A1 * | 10/2016 | Hilpert | ................ | E21B 33/06 |
| 2022/0299022 A1 * | 9/2022 | Dion | .................... | F04B 51/00 |

FOREIGN PATENT DOCUMENTS

| | | | |
|---|---|---|---|
| WO | 2011/090941 A1 | 7/2011 | |
| WO | 2020227304 A1 | 11/2020 | |
| WO | WO-2022159477 A1 * | 7/2022 | ......... G01M 13/003 |

OTHER PUBLICATIONS

Marathon Petroleum Company LP . (n.d.). Pressure testing. https://www.marathonrefinerycontractor.com/content/documents/Refinery_Contractor/Detroit/Detroit_Safety_Documents/Other_Procedures/Pressure_Testing/202_304_7.pdf (Year: 2022).*

(Continued)

*Primary Examiner* — Alexander A Mercado
(74) *Attorney, Agent, or Firm* — Osha Bergman Watanabe & Burton LLP

(57) ABSTRACT

A method to automatically and continuously control and monitor a pressure required to conduct a hydrotest of a vessel includes using a portable hydrotest system to draw utility water on a hydraulic path in hydraulic communication with the vessel. The method includes opening a shutoff valve mounted in an air flow path to supply pneumatic power to a hydraulic pump on the hydraulic path and pumping the utility water along the hydraulic path. The hydraulic path continues through an inlet valve, a check valve, and an outlet valve. The water is pumped into the vessel to pressurize the water to achieve a test pressure, then holding, using the check valve, the test pressure. The method includes measuring, using a monitoring subsystem, a pressure parameter of the test pressure within the vessel; and reducing, using a drain valve in hydraulic communication with the hydraulic path, the test pressure.

20 Claims, 4 Drawing Sheets

(56) References Cited

OTHER PUBLICATIONS

Bubar, Barry G., "Pipeline Planning and Construction Field Manual"; Gulf Professional Publishing; Chapter 18: Hydrostatic Testing; pp. 379-404; 2011 (26 pages).
Regula, Jerry, "How to Successfully Prepare and Complete a Hydrostatic Test"; McWane Ductile; Apr. 12, 2019; <https://www.mcwaneductile.com/blog/how-to-successfully-prepare-and-complete-a-hydrostatic-test/>; Accessed Sep. 22, 2021 (13 pages).
PressureJet Systems Pvt. Ltd., "Hydrotest System"; Apr. 17, 2019 (4 pages).
High Pressure Equipment Company, "PT2020 Programmable Pneumatic Pump Controller"; pp. 1-59; Mar. 1, 2021 (60 pages).
Office Action Issued in Corresponding Saudi Arabian Application No. 123447407, dated Jun. 27, 2024, 12 pages.

\* cited by examiner

FULLY-AUTOMATIC PORTABLE HYDROTEST SYSTEM

BACKGROUND

Hydrostatic pressure testing, or "hydrotesting," provides a method of finding leaks and flaws in pressure vessels used for pipelines, refineries, chemical plants, oil and gas drilling and production, plumbing, or other operations, and to determine whether a particular installation is suitable and safe for use with the working pressure to which it will be exposed. Newly manufactured pressure vessels may be initially qualified using hydrotesting. Used pressure vessels may also undergo hydrotesting, i.e., having a hydrotest performed on the pressure vessels.

The method includes filling the pressure vessel with a relatively incompressible fluid such as water, pressurizing the pressure vessel to reach a test pressure, holding the test pressure, then performing a visual inspection for leaks, shape changes, etc. The test pressure may be monitored to determine trends in pressure changes that may indicate a leak. The test pressure may be selected in terms of a factor of a rated working pressure of the pressure vessel, such as 1.5 times the rated working pressure.

Conventional hydrostatic pressure testing equipment (hydrotest equipment) and methods may have deficiencies in terms of test timeliness, test accuracy, and personnel safety. This conventional methodology using such setups requires removing the pressure vessel to be tested from its in-service location to the hydrotest equipment location, thus incurring time for dismantling, removing, and shipping the pressure vessel. Likewise additional time will be required during testing while gradually and manually adjusting the test pressure to obtain the target pressure of the hydrotest. Pressure measuring using pressure gauges that are not made for, or not configured for a data acquisition capability, such as dial pressure gauges (analog pressure gauges), may require presence of a human sitting near to the hydrotest equipment. This practice may incur risk of exposure to hazards that may cause injuries. Furthermore, having a human reading the pressure gauges to acquire the data may result in test record inaccuracies.

The problems faced while performing the hydrotest using old methodology and hydrotest equipment further include delays in dismantling, removing, and transporting the pressure vessel from its in-service location to the hydrotest equipment location. Errors may be introduced while performing the hydrotest by having the human manually adjusting the test pressure. Consumption of excess time may be incurred due to frequent pressure adjusting in order to manually reach the target pressure setpoints of the hydrotest. Personnel may be exposed to hazards while performing the hydrotest. Hazards may include the risk of high-pressure leaks, etc.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and systems for a Fully-Automatic Portable Hydrotest System.

In one aspect, embodiments disclosed herein relate to a method to automatically and continuously control and monitor a pressure required to conduct a hydrotest of a vessel. The method includes using a portable hydrotest system to draw utility water from a utility water source on a hydraulic path in hydraulic communication with the vessel. The method includes opening a shutoff valve mounted in an air flow path to supply utility air to provide pneumatic power to a hydraulic pump on the hydraulic path, pumping the utility water, using the hydraulic pump, along the hydraulic path. The hydraulic path continues through an inlet valve, a check valve, and an outlet valve. The water is pumped into the vessel to achieve a pressure within the vessel. The method also includes using the hydraulic pump to pressurize the water within the vessel to achieve a test pressure within the vessel, then holding, using the check valve, the test pressure within the vessel. The method includes measuring, using a monitoring subsystem, a pressure parameter of the test pressure within the vessel; and reducing, using a drain valve in hydraulic communication with the hydraulic path, the test pressure within the vessel.

In another aspect, embodiments disclosed herein relate to a portable hydrotest system for conducting a hydrotest of a vessel. The portable hydrotest system is mounted on a portable skid. The system includes a hydraulic pump and a check valve along a hydraulic path. The system also includes a monitoring subsystem, hydraulic connections to connect the vessel to an output of the hydraulic path; and a utility water source providing utility water in hydraulic communication with an input to the hydraulic path. The hydraulic pump is actuated by a solenoid valve and is configured to draw utility water from the utility water source for pressurizing the vessel to a target pressure. The check valve is configured to hold the target pressure and the monitoring subsystem is configured to monitor the hydraulic pump, the solenoid valve, and the target pressure.

Other aspects and advantages of the claimed subject matter will be apparent from the following description and the appended claims.

DETAILED DESCRIPTION

Figure 1:
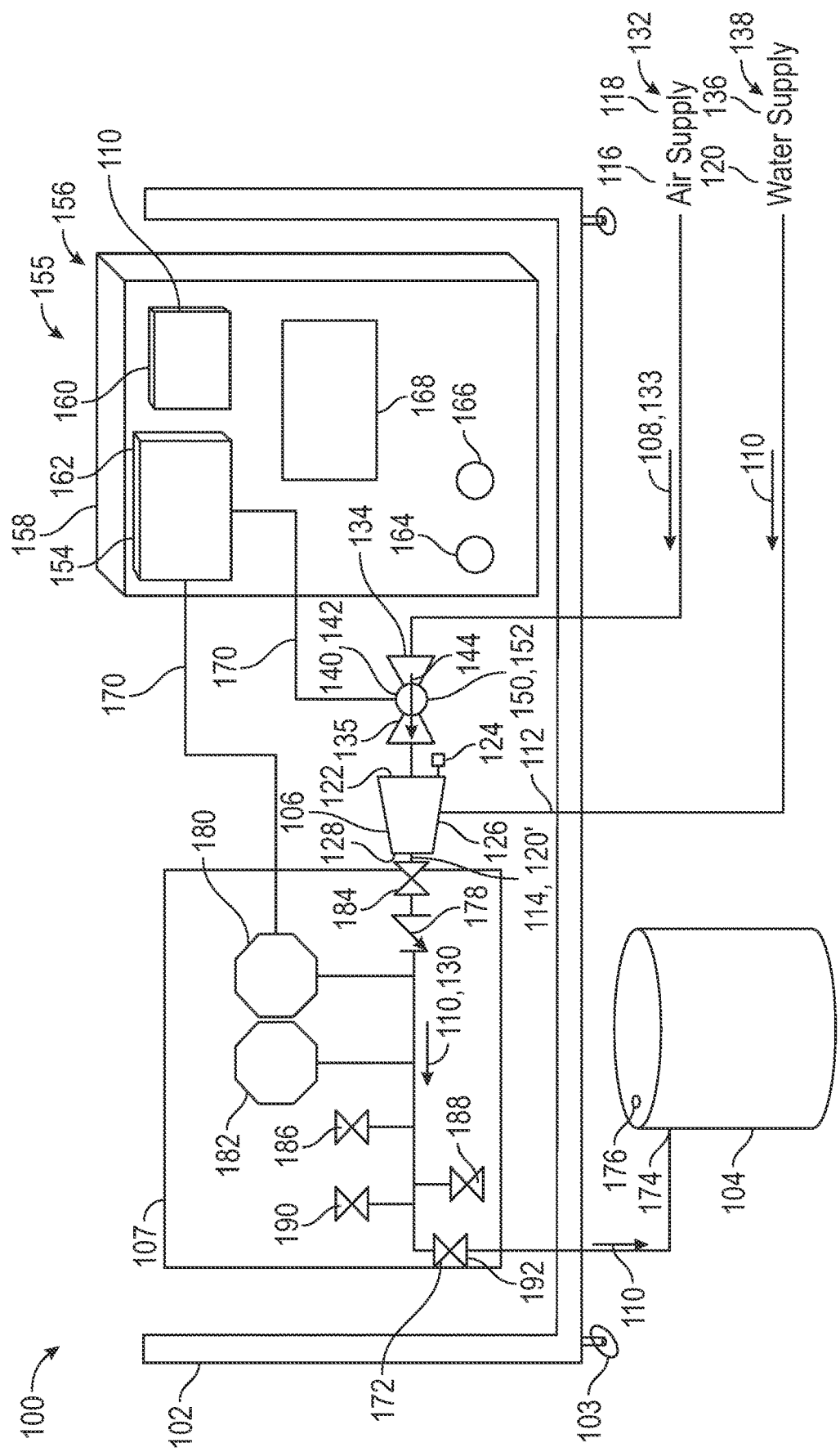
FIG. 1 shows a system in accordance with one or more embodiments.

Disclosed herein is a method and a system that will provide more accurate and automated control of hydrostatic pressure tests with minimum human operator interaction, thus reducing the risk of injury to the operator. The hydrostatic pressure test or "hydrotest" is a test in which a relatively incompressible test medium such as a liquid such as water is used to fill, in the case of an internal hydrotest, a void inside a pressure vessel. The test volume of the internal hydrotest may comprise the void volume. Pressure is applied to the test medium to achieve a test pressure and a visual inspection is performed to observe for leaks from the pressure vessel, or changes in shape of the pressure vessel. An external hydrotest is one in which the pressure vessel is placed in a test vessel and the test medium surrounds the exterior of the pressure vessel. The test medium surrounding the pressure vessel is pressurized to the test pressure. The test volume of the external hydrotest may comprise a test vessel volume minus the pressure vessel volume. To check for leaks from the external hydrotest into the void within the pressure vessel, instrumentation may be used to detect intrusion into the void, or the pressure vessel may be disassembled to perform the visual inspection for test medium intrusion into the void.

A portable and fully-automated hydrostatic pressure test system (portable hydrotest system, hereafter "system") may utilize state of art technologies for pressure sensing and pressure control. The system may be fully contained within a skid that is movable (a portable skid) and compact to facilitate conducting hydrotests in proximity to the pressure vessel to be hydrotested. In this context the skid is a low platform on which the system components are mounted for handling and moving. The system may use digital pressure measurement devices that may continuously measure the pressure in the pressure vessel. The pressure measurement may be electronically transmitted to a programmable pressure controller (hereafter "controller") within a control system. The controller is set to activate the final control element at the target pressures of the hydrotest. The final control element may be an electrically-actuated or an air-actuated valve that may open or close before, upon, or after receipt of a signal from the controller. The controller may be digitally set to send the signal when the pressure in the pressure vessel meets a target pressure tolerance.

In accordance with one or more embodiments the system may work automatically and may continuously monitor and control the pressure required to conduct the hydrotest of the pressure vessel. The system may be used to perform hydrostatic pressure tests ("to test") pressure vessels at various pressures and with a maximum test pressure capability of, for example, up to 5,000 PSI (pounds per square inch) (345 Bar). The system may have a pressurizing device such as a hydrotest pump driven by compressed air (or hydraulic pump, pneumatically powered pump, air-driven liquid pump, and the like, hereafter "pump"), the control system, and a test manifold (hereafter "manifold") all mounted on the skid. The skid may be more easily movable by being mounted on wheels, rollers, castors, and the like. So equipped, the portable skid will provide flexibility to move the hydrotest capability near to the in-place pressure vessel to be tested rather than transporting the pressure vessel to the immovable (static) system. Moving the hydrotest capability to the in-place pressure vessel and automating the test procedure may simplify the test setup, may make the test timelier (requires less time to complete the test), and thus may make the testing faster.

The system may include the control system and related instrumentation to achieve the automation capability. The system may include pressure sensing devices, such as a pressure transmitter and/or a digital pressure gauge, etc. The system may include a pressure safety relief capability, such as through the use of a relief valve, a rupture disk, a bypass valve, etc., disposed to protect the system from overpressure by avoiding, preventing, and/or mitigating against overpressure conditions. The system may include the final control element. The control system may control the pressure in the system.

The pump may supply water to the manifold as an initial fill of the pressure vessel and/or of the test vessel. After that, water will be further pressurized to the target pressure of the hydrotest by actuating a shutoff valve that supplies the compressed air to the pump to operate the pump. The valve may be actuated from the control system according to one or more instructions received from the controller. The controller may include programmable limit alarm trips and interlocks, a power supply, and adjustable pressure set points. The power supply converts utility electrical power (utility power) to a power specification compatible with the controller.

The manifold may be part of this hydrotest system, and it may contain the pressure measuring device, the relief valve to avoid overpressure conditions, a check valve, and inlet, outlet, vent, and drain valves that will provide interconnectivity between supplied water and the pressurized water used for testing.

FIG. 1 shows the system (100) in accordance with one or more embodiments. In one or more embodiments, one or more of the modules and/or elements shown in FIG. 1 may be omitted, repeated, combined, and/or substituted. Accordingly, embodiments disclosed herein should not be considered limited to the specific arrangements of modules and/or elements shown in FIG. 1.

In one or more embodiments, FIG. 1 shows the system (100) mounted on the skid (102) with castors (103) and in hydraulic communication with equipment (104) to be tested such as a pressure vessel (200, FIG. 2) described below in FIG. 2, or a test vessel (300, FIG. 3) described below in FIG. 3.

System (100) has a pressurization device such as pump (106), a controller (154), a manifold (107), and hydraulic and/or pneumatic lines such as pipes, tubes, hoses, etc. connecting the components. System (100) has an air flow path (108) and a hydraulic path (110). The hydraulic path (110) has a relatively low-pressure side (hereafter "low side" (112)) and a relatively high-pressure side (hereafter "high side" (114).) Pump (106) may be powered by a pump operating medium (116) such as compressed air (118) following the air flow path (108). Pump (106) is arranged in the hydraulic path (110) between the low side (112) and the high side (114) and is configured to pressurize a test medium (120) following the hydraulic path (110) to form a pressurized test medium (120'). Pump (106) may pressurize the pressurized test medium (120') to a target pressure. Pump (106) may pressurize the test medium (120) at a test medium flowrate.

Pump (106) comprises a pump air supply inlet (122) and a pump air exhaust outlet (124), both of which form part of the air flow path (108). Pump (106) comprises a pump inlet (126) for the test medium and a pump outlet (128) for the test medium, both of which form part of the hydraulic path (110). Pump (106) may cause the test medium (120) to flow in a pumped direction (130) from the pump inlet (126), to the pump outlet (128), at the test medium flowrate, to the equipment (104). The pump air supply inlet (122) receives the compressed air (118) from a utility air source that provides utility air (132). The utility air (132) is compressed air (118) that is distributed throughout a workshop. Pump (106) exhausts the compressed air (118) through the pump air exhaust outlet (124). The utility air (132) causes the compressed air (118) to flow in a compressed air direction (133) from the shutoff valve inlet (134), to the shutoff valve outlet (135), to the pump air supply inlet (122), and out to the pump air exhaust outlet (124). The pump inlet (126) draws test medium (120) such as utility water (138) from a test medium source (136) such as a utility water source. Pump (106) pressurizes the test medium (120) and forms the pressurized test medium (120') at the target pressure. Pump (106) sends the pressurized test medium (120') out of the pump outlet (128) along the hydraulic path (110) in the pumped direction (130). System (100) may include a test medium outlet (192) of a manifold outlet valve (172). The utility water (138) is water that is distributed throughout a workshop.

The utility air (132) may be provided to the pump air supply inlet (122) through a shutoff valve (140), such as a ½-in (inch) solenoid valve (142), configured to control flow of the compressed air (118) to pump (106). The compressed air (118) provides pneumatic power to pump (106). The shutoff valve (140) comprises a shutoff valve flow path (144) that forms part of the air flow path (108), a valve opened position to allow flow along the air flow path (108), and a valve closed position to prevent flow along the air flow path (108). The shutoff valve (140) may be manually operated and/or it may have a valve actuator (150) that operates the valve without requiring human intervention by means such as electrical power, pneumatic power, or other ways. The shutoff valve (140) with the valve actuator (150) may have a valve override (152) configured to manually operate the shutoff valve from the valve opened position to the valve closed position or from the valve closed position to the valve opened position. The valve actuator (150) using electrical power may operate the shutoff valve (140) using a motor, a solenoid, or other means. The valve actuator (150) of the shutoff valve (140) may be configured to receive from the controller (154) a signal to operate. The motor may operate the shutoff valve (140) directly or through a gearbox, a rack and pinion, levers, cams, and/or the like. The solenoid may operate the shutoff valve (140) directly or through a series of levers, hinges, and/or the like. The shutoff valve (140) may operate in cooperation with a spring configured either to push or to pull such as a coil spring, wave spring, torsion spring, etc. The valve actuator (150) using pneumatic power may operate the valve using compressed air (118) acting upon an actuator diaphragm, a piston-cylinder, a plunger-cylinder, a rack-and-pinion, and/or other means.

In accordance with one or more embodiments, system (100) may include a control system (155) and a monitoring subsystem (156). The control system (155) also includes a control panel (158) for use as the interface between an operator and system (100). The control panel (158) uses a power supply (160), the controller (154) with a computer processor (162) in the controller (154), in combination with the monitoring subsystem (156) to control the operation of system (100) through the control system (155). The power supply (160) may receive an input voltage of, for example, 110 or 220 VAC (volts alternating current) at 60 Hz (Hertz) of utility power. Control panel (158) includes a power switch (164) and an input interface (166) used, for example, to input pressurization cycles, pressure settings, temperature limits, etc. The monitoring subsystem (156) may include one or more sensors (e.g., pressure transmitter, temperature sensor, etc.) configured to measure, for example, test pressure, test temperature, and pressure parameters of equipment (104), manifold (107), and/or other parameters. The monitoring subsystem (156) may include digital precision pressure test gauges (hereafter "digital gauges" (182)) instead of analog pressure gauges. These gauges may provide, for example, an accurate measurement of 0.05 percent of full scale. In addition, the digital gauges (182) may provide a data logging feature to monitor and analyze pressure increments in the system. The monitoring subsystem (156) may include a display (168) showing all system parameters, such as pressure parameters, and including a protection system to provide limit alarm trips and one or more program interlocks.

The system may include sensors such as motion detectors and surveillance cameras in proximity to the equipment to be tested.

One or more computer-readable media associated with the controller (154) may also include computer-executable instructions (a program) configured to collect, store, parse, and analyze the operational data of the system. The program may be configured to perform operations consistent with embodiments of the present disclosure, for example, determine current state variables of system (100), adjust various operating characteristics based on determined values, etc. The program may further arithmetically calculate revised state variables that seek output state goals, such as for example, mathematically seeking target values associated with variables of the system in response to feedback from a workflow in cooperation with systems and methods of the present disclosure. While system (100) may correspond to the single pump (106), in some embodiments, system (100) may correspond to multiple pumps (106). The control system (155) may also include a computer system that is the same as or similar to that of computer (502) described below in FIG. 5 and the accompanying description. The control panel (158) may be connected to the skid (102) using a suitable means such as screws, bolts, welds, etc. and using suitable materials such as angle iron, cold-rolled steel, hot-rolled steel, aluminum, etc.

In one or more embodiments, an electrical cable harness (170) may be used to connect some or all of the electrical components of system (100) of FIG. 1. The electrical cable harness (170) is also configured to transmit current, keep control over the system, and provide connection to the monitoring subsystem.

In accordance with one or more embodiments a check valve (178) forms part of the hydraulic path (110). The check valve (178) permits test medium (120) flow in the pumped direction (130) and prevents test medium (120) flow opposite to the pumped direction (130). Instrumentation such as a pressure transmitter (180) and a pressure indicator such as a digital gauge (182) are in pressure communication with the hydraulic path (110) between the check valve (178) and the equipment (104). Pressure transmitter (180) may be in communication with controller (154). The hydraulic path (110) may include between a manifold inlet valve (184) and the manifold outlet valve (172), the check valve (178), a vent valve (186), a drain valve (188), and a relief valve (190), each of which are in hydraulic communication with the hydraulic path (110). The equipment (104) port (174) and the test vessel (300) port (174) are configured to be in pressure communication with the manifold (107) at the test medium outlet (192) of the manifold outlet valve (172). Pressure communication may be achieved with hydraulic connections connecting the vessel to the output of the hydraulic path.

The manifold inlet valve (184), the check valve (178), the vent valve (186), the relief valve (190), the manifold outlet valve (172), and the drain valve (188) may comprise a material compatible with the test medium (120) and/or the equipment (104). The manifold inlet valve (184), the check valve (178), the vent valve (186), the relief valve (190), the manifold outlet valve (172), and the drain valve (188) may be sized in a configuration compatible with the test medium flowrate and/or the equipment (104) void (202) volume. The vent valve (186) and/or the drain valve (188) may be configured to allow release of the pressurized test medium (120') to form the test medium (120), for example at the conclusion of the test. The relief valve (190) may be configured with a set relief pressure to allow release of the pressurized test medium (120') in the event that a pressure limit is reached and/or exceeded. In such a case the pressurized test medium (120') will flow through the relief valve (190) at an overpressurization release flowrate. The relief valve (190) may be sized in a configuration compatible with the pressurized test medium (120') overpressurization release flowrate. The pressure limit may be such as the target pressure, a maximum design pressure of system (100), a maximum test pressure capability of system (100), and/or a maximum pressure of the equipment (104) and/or of the test vessel (300). The drain valve (188) is disposed in the hydraulic path (110) and configured with a drain valve actuator to allow draining the hydraulic path (110) at the conclusion of the test. Valves equipped with an actuator, such as the drain valve, may include a fail-safe open option to depressurize the hydraulic flow path if the drain valve actuator fails.

Figure 2:
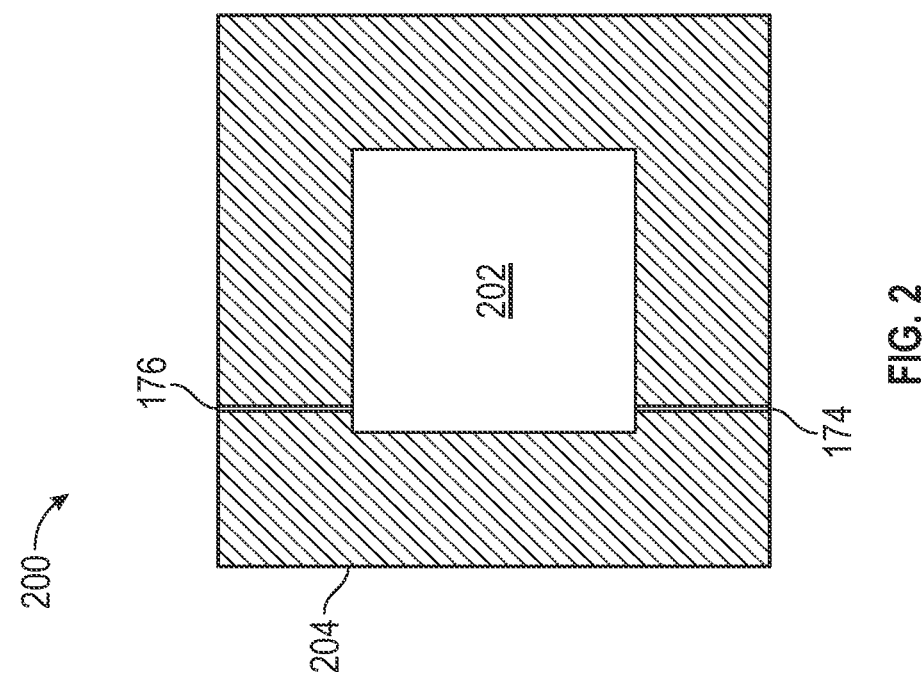
FIG. 2 shows the system in accordance with one or more embodiments.

FIG. 2 shows a detail of the equipment (104) such as the pressure vessel (200) and shows that the pressure vessel has a void (202) internal to the pressure vessel (200) and a pressure vessel volume (204) external to the pressure vessel (200). The internal hydrotest may use a volume of the test medium (120) equivalent to that of the void (202). FIG. 3 shows a detail of the equipment such as the test vessel (300) and a test vessel volume (302) of the test vessel. The external hydrotest may use a volume of the test medium (120) equivalent to that of the test vessel volume (302) minus the pressure vessel volume (204). The pressurized test medium (120') exits the test medium outlet (192) and follows the hydraulic path (110) to the pressure vessel (200) and/or to the test vessel (300). System (100) may include at the test medium outlet (192) the manifold outlet valve (172) configured to connect to a port (174) in the pressure vessel (200) or in the test vessel (300). The port (174) on the pressure vessel (200) is configured to allow hydraulic communication from the exterior of the pressure vessel (200) to the void (202). The port (174) on the test vessel (300) is configured to allow hydraulic communication from the exterior to the interior of the test vessel (300). The pressure vessel and/or the test vessel may include a vessel vent port (hereafter, air vent (176)) with an opened and closed position that, when set to the open position, allows air to escape while filling and for air to enter while draining. When sealed the air vent (176) may contain pressure of the pressure vessel and/or the test vessel.

Figure 3:
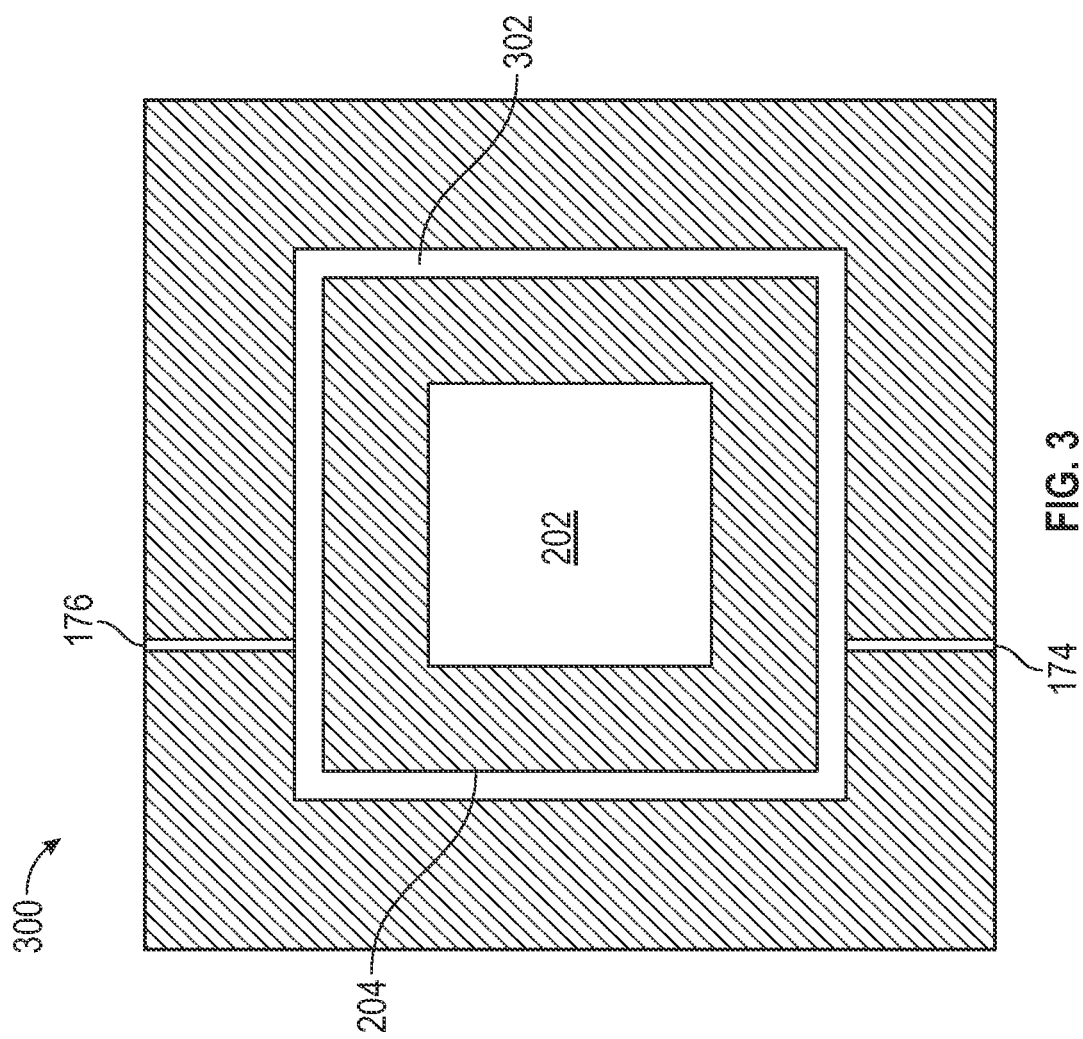
FIG. 3 shows the system in accordance with one or more embodiments.
Figure 4:
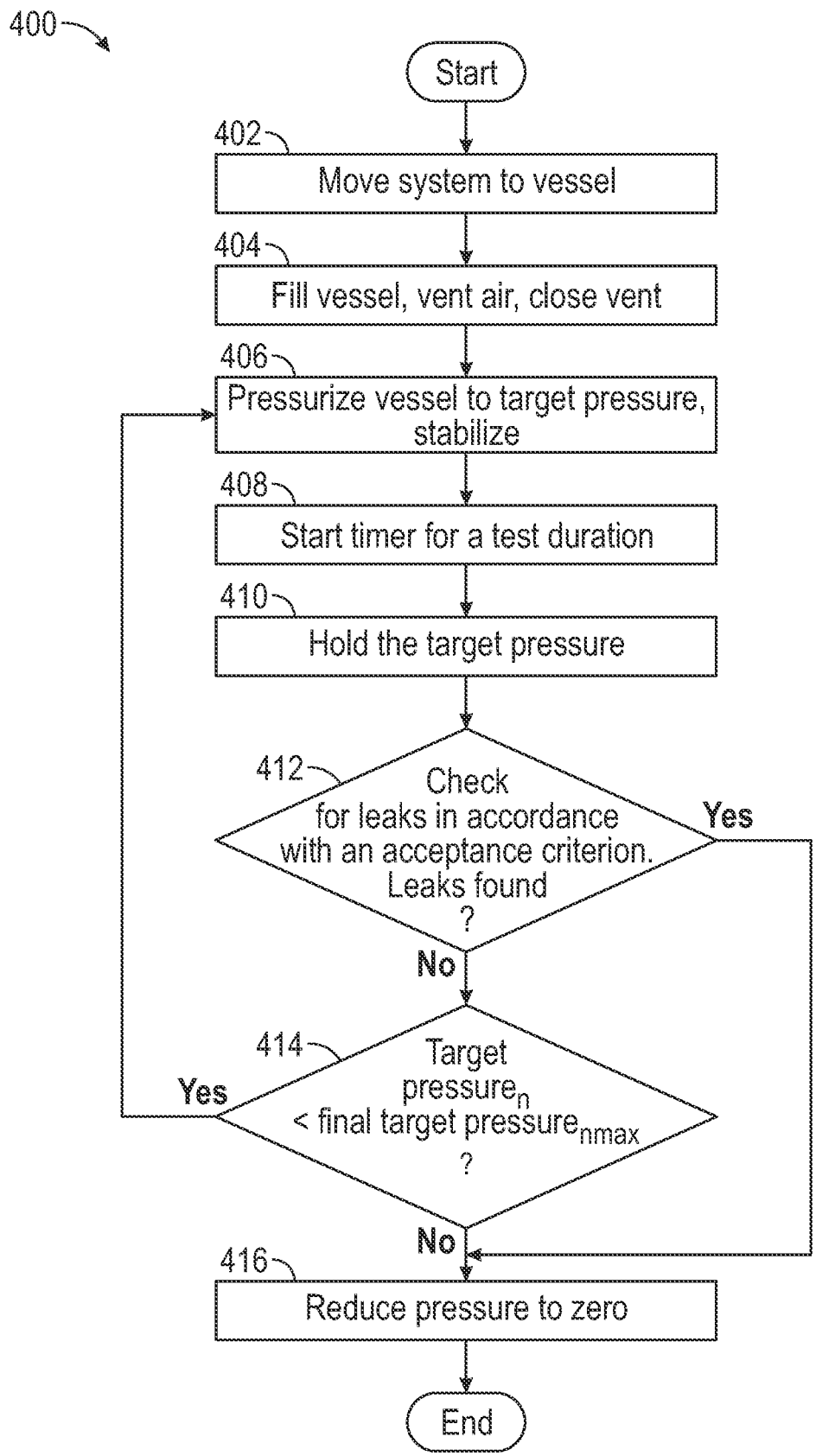
FIG. 4 shows a flowchart in accordance with one or more embodiments.

FIG. 4 illustrates a method (Block 400) for automatically and continuously controlling and monitoring a pressure required to conduct a hydrotest of a pressure vessel using the portable hydrotest system, system (100). Further, one or more steps in FIG. 4 may be performed by one or more components as described in FIGS. 1-3 (e.g., system (100)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively. Testing operators may launch an automated software for operating the system (100). The testing operator may acknowledge various steps of the method by clicking on, in the input interface, text descriptions of the steps.

Referring to FIGS. 1-3 together, initially system (100) is disposed in proximity to the equipment to be tested (Block 402). The testing operator may install motion detection sensors (surveillance cameras) in proximity to the equipment to be tested and system (100). The testing operator may then click on the text description CONFIRM_MOTION to acknowledge within the software completion of the method step of installing the motion detectors. The test medium outlet (192) of the manifold outlet valve (172) is hydraulically connected, by the testing operator, to the port (174) of the equipment to be tested. The utility air (132) is pneumatically connected to the shutoff valve inlet (134). The utility water (138) is hydraulically connected to the water supply connection at the pump inlet (126). The power supply (160) is electrically connected to utility power. The testing operator may then click on the text description CONFIRM_HOSES to acknowledge within the software completion of the method step for connecting the testing hoses.

The equipment to be tested may be the pressure vessel (200) comprising the void (202). The pressure vessel (200) may be subjected to an internal pressure test that pressurizes the void (202) within the pressure vessel (200). The test objective of the internal pressure test may be, for example, to confirm, to a set of acceptance criteria, the pressure integrity of the pressure vessel (200) to contain pressure within the void (202). Alternatively, the pressure vessel may be subjected to an external pressure test that pressurizes the exterior of the pressure vessel (200).

The test objective of the external pressure test may be, for example, to confirm, to a set of acceptance criteria, the pressure integrity of the pressure vessel (200) to prevent pressure entering the void (202). The acceptance criteria may include, in the case of an internal pressure test, a rate of pressurized test medium (120') egress from the void (202) to the exterior of the pressure vessel (200) ("leak rate" of an "external leak"). The acceptance criteria may include, in the case of an external pressure test, a rate of pressurized test medium (120') ingress from the exterior of the pressure vessel (200) into the void (202) ("leak rate" of an "internal leak").

The internal pressure test includes filling the void (202) within the pressure vessel (200), then pressurizing the utility water (138) within the void (202) and monitoring for leaks out of the pressure vessel (200) void (202). The external pressure test includes disposing the pressure vessel (200) within the test vessel (300), filling the test vessel (300) with the utility water (138), pressurizing the utility water (138) exterior to the void (202) within the pressure vessel (200), then monitoring for leaks into the void (202) of the pressure vessel (200).

Filling and pressurizing the pressure vessel (200) or the test vessel (300) progresses in the same way, thus hereafter filling and pressurizing the pressure vessel (200) or the test vessel (300) will be referred to as filling or pressurizing the vessel, respectively. The next step is to fill the vessel (Block 404). Filling the vessel may include venting air (bleeding air) out of the air vent (176) by opening the air vent (176) before, when, or after the test medium fills the vessel. The bleeding air is complete before, when, or after water replaces displaced air at the port (174) and/or air vent (176). The testing operator may then click on the text description CONFIRM_AIRFREE to acknowledge within the software completion of the method step for bleeding air and confirming that the equipment to be tested is fully filled with water and that there is no air trapped inside the equipment to be tested.

The operator may prepare the workflow of a list of pressurization cycles, then select the pressure test criteria of a first pressurization cycle and perform at least one pressurization cycle from the workflow. The pressurization cycle includes pressurizing, holding, then changing the pressure of the vessel. The pressurizing may occur manually or may occur automatically, using the controller (154) of system (100).

The parameters of the pressurization cycles in the list of pressurization cycles may follow a hydrotest plan that has a set of pressure test criteria. The pressure test criteria may include modifying the characteristic of the pressure through a series of steps such as adjustable pressure set points, programmable limit alarm trips, and data logging instructions. Data logging instructions may include, for example, recording the pressure at given time intervals, recording duration of pumping time, etc. Program interlock parameters may include vessel material and test medium chloride content. The program may prevent the test proceeding if the operator enters, for example, a vessel material of stainless steel and a chloride content of 50 PPM (parts per million) or higher.

Programmable limit alarm trips may include providing audible and visual alarms or taking other actions such as stopping the pump. Alarms and actions may be activated for conditions such as if a maximum pressure limit is met or exceeded, if a minimum pressure limit is not met or exceeded, if a maximum pumping duration is met or exceeded, if a temperature upper limit is met or exceeded, etc. The adjustable pressure set points may include a set of test pressures for each of the pressurization cycles such as a first test pressure (test pressures$_1$), a second test pressure (test pressure$_2$), through an nth test pressure (test pressure$_n$). An example temperature upper limit is 120° F. (degrees Fahrenheit.)

After confirming and completing the data entry, the operators may start the hydrotest. The software may continuously monitor the test pressure, fluid temperature, and movements around the test system. In case pressure reaches the Hydrotest pressure setting ($P_1$) during the set duration ($T_1$), the software may activate a message (GREEN) that the hydrotest reached required set pressure and the testing hold time is triggered. In case pressure reaches the Hydrotest pressure setting ($P_2$) during the set duration ($T_2$), the software may activate a message (GREEN) that the hydrotest reached required set pressure and the testing hold time is triggered. In case pressure reaches the Hydrotest pressure setting ($P_n$) during the set duration ($T_n$), the software may activate a message (GREEN) that the hydrotest reached required set pressure and the testing hold time is triggered.

Once the testing is completed, the software may activate a message (GREEN) that the hydrotest is completed successfully, and the software may save the testing parameters trends for future records and printing. Once the testing is completed, the software may activate the drainage mechanism, which may be the drain valve (188) actuator. The software monitors the test pressure, and before, when, or after the test pressure reaches PSI, the software may activate an instruction to the testing operators to confirm no testing fluid remains in the system. Testing operators shall visually check no water testing fluid is available and click on CONFIRM_WATERFREE.

In case of the acceptance criteria not being met, such as by a pressure drop indicating leaks during any of the above time slots ($T_1$, $T_2$ and $T_n$), audible and visual alarms are triggered, a warning alarm (YELLOW) is activated, and the test may be stopped. In case of pressure not building up for a period of time, the system may generate audio visual alarms, and warning alarm (YELLOW) is activated indicating that there is a problem in the test system, and the testing may be stopped. In case the pressure in the system exceeds the pressure relief valve setting (PZV) indicating a failure in the pressure relief valve, the software may activate an emergency alarm (RED), the testing may be stopped, and the drainage mechanism may be triggered. In case the test fluid temperature exceeds the maximum fluid temperature ($T_{max}$), the system may generate audio visual alarms, and a warning alarm (YELLOW) may be activated.

In case motion detection sensors (surveillance camera) detect movements around the system, the system may generate audio visual alarms and a warning alarm (YELLOW) may be activated. If this alarm is not cleared within a set period of time such as one minute, the software may activate an emergency alarm (RED) and the testing may be stopped.

Operator inputs may include the following:

Hydrotest Settings:
  a. The number of hydrotest pressure settings (1, 2, or n)
  b. Hydrotest pressure settings in PSI ($P_1$, $P_2$, and $P_n$)
  c. Testing hold Time in minutes for each pressure settings ($T_1$, $T_2$, and $T_n$)
  d. Equipment Material specification (CS for Carbon Steel, SS for Stainless Steel, . . . etc.)
  e. Test Fluid (FLUID)
  f. Maximum testing fluid temperature ($T_{max}$) in Deg F.
  g. Maximum chloride content setting (CL) in PPM
  h. Pressure relief valve setting (PZV) in PSI
  i. Maximum Time slot with no pressure build up ($T_{npb}$) in minutes Testing Equipment Information:
  a. Pressure Sensor #1 Range (Minimum/Maximum)
  b. Pressure Sensor #2 Range (Minimum/Maximum)
  c. Pressure Sensor #1 Calibration Date
  d. Pressure Sensor #2 Calibration Date
  e. Temperature Sensor Range (Minimum/Maximum)
  f. Temperature Sensor Calibration Date Operator actions may include the following:

Prior to Testing:
  a. Click on CONFIRM_MOTION to acknowledge within the software completion of the method step of installing the motion detectors.
  b. Click on CONFIRM_HOSES to acknowledge within the software completion of the method step for connecting the testing hoses
  c. Click on CONFIRM_AIRFREE to acknowledge within the software completion of the method step for bleeding air and confirming that the equipment to be tested is fully filled with water and that there is no air trapped inside the equipment to be tested.

During Testing:

The operators may start the test following the "Prior to Testing" steps above. The software may continuously monitor the test pressure, fluid temperature, and movements around the test system
  a. In case pressure reaches the Hydrotest pressure setting ($P_1$) during the set duration ($T_1$), the software may activate a message (GREEN) that the hydrotest reached required set pressure and the testing hold time is triggered.
  b. In case pressure reaches the Hydrotest pressure setting ($P_2$) during the set duration ($T_2$), the software may activate a message (GREEN) that the hydrotest reached required set pressure and the testing hold time is triggered.
  c. In case pressure reaches the Hydrotest pressure setting ($P_n$) during the set duration ($T_n$), the software may activate a message (GREEN) that the hydrotest reached required set pressure and the testing hold time is triggered.

d. Once the testing is completed, the software may activate a message (GREEN) that the hydrotest is completed successfully, and the software may save the testing parameters trends for future records and printing.
e. Once the testing is completed, the software may activate safe drainage mechanism. The software may monitor the test pressure, and if the test pressure reaches 0 PSI, the software may activate a command to the testing operators that they shall confirm no testing fluid is available in the system. Testing operators shall visually check no water testing fluid is available and click on CONFIRM_WATERFREE.
f. In case of pressure drop indicating leaks during any of the above time slots ($T_1$, $T_2$ and $T_n$), audible and visual alarms are triggered, warning alarm (YELLOW) is activated, and the test may be stopped.
g. In case of pressure not building up for a certain period of time, the system may generate audio visual alarms, and warning alarm (YELLOW) is activated indicating that there is a problem in the test system, and the testing may be stopped.
h. In case the pressure in the system exceeds the pressure relief valve setting (PZV) indicating a failure in the pressure relief valve, the software may activate an emergency alarm (RED), the testing may be stopped, and the safe drainage mechanism may be triggered.
i. In case the test fluid temperature is exceeding the maximum fluid temperature ($T_{max}$), the system may generate audio visual alarms, and a warning alarm (YELLOW) may be activated.
j. In case motion detection sensors (surveillance camera) detect movements around the system, the system may generate audio visual alarms and a warning alarm (YELLOW) is activated. If this alarm is not cleared within 1 minute, the software may activate emergency alarm (RED) and the testing may be stopped.

The hydrotest plan may include the operator inputting the pressure test criteria into the controller (154). The pressurization cycle begins by pressurizing the vessel (Block 406) by actuating the system (100). The controller (154) may send a signal to the valve actuator (150) to open the shutoff valve (140) to send utility air (132) to pump (106). The controller may measure, record, and monitor the pressure within the vessel and control pump (106) in response to the measuring. The controller may send signals such as a signal to open shutoff valve (140) to increase pressure, to close shutoff valve (140) to stop increasing pressure, to open drain valve (188) to reduce pressure, and to close drain valve (188) to stop reducing pressure. The controller may open and/or close the shutoff valve (140) and/or the drain valve (188) to stabilize the pressure in accordance with at least one pressure stabilization criterion such as target pressure tolerance and target pressure decrease over time (decay rate.) A pressure sensing element, such as pressure transmitter (180) may continuously sense the pressure in the manifold and provide the pressure to controller (154). Before, when, or after the stabilization criteria are met, the controller may start a pressure test hold duration timer (Block 408) set to a target pressure hold duration. The controller may monitor and hold the pressure (Block 410) for a period of time such as the hold duration. The controller may not attempt to adjust the pressure until after the hold duration has expired.

The controller and/or the operator may check for leaks in accordance with an acceptance criterion (Block 412). For the controller to check for leaks, the computer processor (162) of the controller (154) monitors a set of operational parameters of the vessel, such as pressure parameters, time of day parameters, and duration parameters, using the monitoring subsystem (156). The computer processor (162) collects a set of data of the set of operational parameters and determines characteristics of the operational parameters to make determined characteristics such as rate of change of pressure. The computer processor (162) compares the set of data of the set of operational parameters with the acceptance criteria.

The controller may store at least one result in an operational record and/or insert a new record in the operational record indicating the pressure test results in accordance with the hydrotest plan pressure test criteria. The computer processor (162) then controls the system in response to the comparing. If leaks are found (Block 412: no, acceptance criteria not met), then the controller may take a further action such as proceeding to a shut down sequence (Block 416), operating the pump, operating valves, sending an alarm, alerting the operator, and/or ending that pressurization cycle and ending the hydrotest plan. If no leaks are found (Block 412: yes, acceptance criteria met), then the system continues to monitor the set of operational parameters until the hold duration expires. Before, when, or after the hold duration expires, the method proceeds by comparing the pressurization cycle test pressure (test pressure$_n$) to the successive test pressure (test pressure$_{n+1}$) or "next pressurization cycle" of the set of test pressures (Block 414).

If there is a next pressurization cycle (Block 414: yes), then the method selects the pressure test criteria of the next pressurization cycle from the hydrotest plan and proceeds to perform the pressurization cycle using the successive test pressure of the set of test pressures. The method thus compares the n$^{th}$ test pressure with the n$_{max}$ test pressure, and so on. The hydrotest plan continues between steps Block 406 and Block 414 until step Block 412 result is no, acceptance criteria not met, or until Block 414 result is no, there is no next pressurization cycle, i.e., there are no further pressurization cycles in the set of test pressures.

If the result of step Block 414 is yes, then the controller begins the next pressurization cycle and may operate the pump to change the pressure by a pressure increment to define an incremented test pressure. In accordance with one or more embodiments the pressure increment may be in a range between −1000 psi to 1000 psi (pounds per square inch). In other words, where adjustment of the test pressure by the pressure increment is intended to increase pressure within the vessel, then a pressure increment may be positive (e.g., 1000 psi). In contrast, where adjustment of the test pressure by the pressure increment is intended to decrease pressure within the vessel, then a pressure increment may be negative (e.g., −1000 psi).

If no pressure change is specified for the successive test pressure, then the increment may be 0 psi. If the test pressure$_n$ was the final test pressure n$_{max}$ of the list of test pressures, i.e., if there is no next pressurization cycle, then the controller may take a further action such as proceeding to the shut down sequence (Block 416). The shut down sequence may include inserting a new record indicating the pressure test results in accordance with the hydrotest plan pressure test criteria, operating the pump, sending an alarm, and/or alerting the operator. The operator and/or the system may then open the vent valve (186), open the drain valve (188), and/or end the hydrotest plan.

Figure 5:
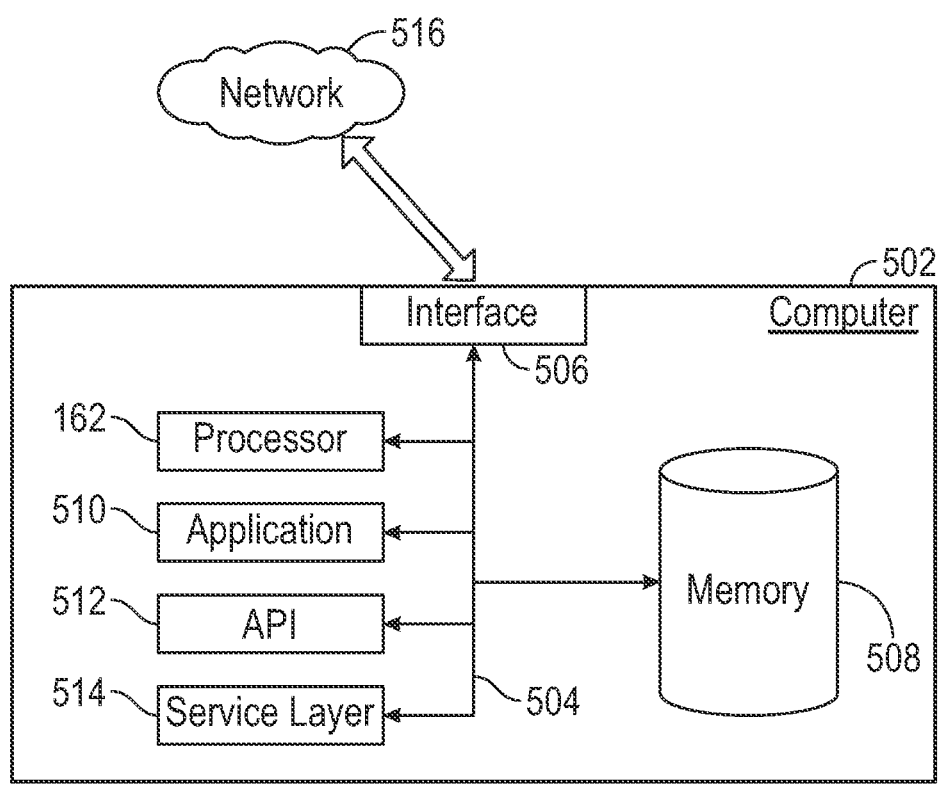
FIG. 5 shows a computing system in accordance with one or more embodiments.

FIG. 5 is a Block diagram of a computer (502) used to provide computational functionalities associated with described algorithms, methods, functions, processes, flows, and procedures as described in the instant disclosure, according to an implementation. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a graphical user interface (GUI.)

The computer (502) can serve in a role as a client, a network component, a server, a database or other persistency, or any other component (or a combination of roles) of a computer for performing the subject matter described in the instant disclosure. The illustrated computer (502) is communicably coupled with a network (516). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (516) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (504). In some implementations, any or all of the components of the computer (502), both hardware or software (or a combination of hardware and software), may interface with each other or the interface (506) (or a combination of both) over the system bus (504) using an application programming interface (API) (512) or a service layer (514) (or a combination of the API (512) and service layer (514). The API (512) may include specifications for routines, data structures, and object classes. The API (512) may be either computer-language independent or dependent and refer to a complete interface, a single function, or even a set of APIs. The service layer (514) provides software services to the computer (502) or other components (whether or not illustrated) that are communicably coupled to the computer (502).

The functionality of the computer (502) may be accessible for all service consumers using this service layer. Software services, such as those provided by the service layer (514), provide reusable, defined business functionalities through a defined interface. For example, the interface may be software written in JAVA, C++, or other suitable language providing data in extensible markup language (XML) format or another suitable format. While illustrated as an integrated component of the computer (502), alternative implementations may illustrate the API (512) or the service layer (514) as stand-alone components in relation to other components of the computer (502) or other components (whether or not illustrated) that are communicably coupled to the computer (502). Moreover, any or all parts of the API (512) or the service layer (514) may be implemented as child or sub-modules of another software module, enterprise application, or hardware module without departing from the scope of this disclosure.

The computer (502) includes an interface (506). Although illustrated as a single interface (506) in FIG. 5, two or more interfaces (506) may be used according to particular desires or implementations of the computer (502). The interface (506) is used by the computer (502) for communicating with other systems in a distributed environment that are connected to the network (516). Generally, the interface (506) includes logic encoded in software or hardware (or a combination of software and hardware) and operable to communicate with the network (516). More specifically, the interface (506) may include software supporting one or more communication protocols associated with communications such that the network (516) or interface's hardware is operable to communicate physical signals within and outside of the illustrated computer (502).

The computer (502) includes at least one computer processor (162). Although illustrated as a single computer processor (162) in FIG. 5, two or more processors may be used according to particular desires or particular implementations of the computer (502). Generally, the computer processor (162) executes instructions and manipulates data to perform the operations of the computer (502) and any algorithms, methods, functions, processes, flows, and procedures as described in the instant disclosure.

The computer (502) also includes a memory (508) that holds data for the computer (502) or other components (or a combination of both) that can be connected to the network (516). For example, memory (508) may include a database storing data and/or processing instructions consistent with this disclosure. According to further embodiments, memory may correspond, for example, to memory (508) where a computer (502) has been implemented as a controller for system (100). Although illustrated as a single memory (508) in FIG. 5, two or more memories may be used according to particular desires and/or implementations of the computer (502) and the described functionality. While memory (508) is illustrated as an integral component of the computer (502), in alternative implementations, memory (508) can be external to the computer (502).

The application (510) is an algorithmic software engine providing functionality according to particular desires and/or particular implementations of the computer (502), particularly with respect to functionality described in this disclosure. For example, application (510) can serve as one or more components, modules, applications, etc. Further, although illustrated as a single application (510), the application (510) may be implemented as multiple applications (510) on the computer (502). In addition, although illustrated as integral to the computer (502), in alternative implementations, the application (510) can be external to the computer (502).

There may be any number of computers (502) associated with, or external to, a computer system containing computer (502), each computer (502) communicating over network (516). Further, the term "client," "user," and other appropriate terminology may be used interchangeably as appropriate without departing from the scope of this disclosure. Moreover, this disclosure contemplates that many users may use one computer (502), or that one user may use multiple computers (502).

While a number of illustrative embodiments have been described in detail above, those skilled in the art will readily appreciate that many modifications are possible in the example embodiments without materially departing from the scope of the present disclosure. For example, according to some embodiments, it may be possible to achieve rapid stabilization by utilizing similar operational characteristics for vessels determined to be similar to previously tested vessels, such as vessels with the same approximate volume and vessels with similar test criteria such as similar pressures and hold durations, etc.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as illustrative only, with a true scope of the disclosure being indicated by the following claims.

What is claimed is:

1. A method comprising:
   selecting a hydrotest for a vessel using a control panel, having a graphical user interface, located in a portable hydrotest system,
      wherein the portable hydrotest system comprises a hydraulic pump, a control system comprising the control panel, a monitoring subsystem comprising a controller, a plurality of sensors, a portable skid, an inlet valve of a manifold, a check valve, an outlet valve, a solenoid valve, and a pressure transmitter configured to transmit pressure measurement data from the pressure transmitter to the controller,
      wherein the monitoring subsystem is configured to monitor the vessel during the hydrotest using the pressure measurement data from the pressure transmitter, and
      wherein the hydrotest comprises a target pressure for pressurizing the vessel during a pressurization cycle;
   connecting a pump outlet of the hydraulic pump to the inlet valve, wherein the manifold comprises the check valve;
   connecting the pressure transmitter between the inlet valve and the outlet valve disposed at an output of a hydraulic path;
   connecting the pressure transmitter to the controller;
   connecting a test medium outlet of the outlet valve to a first port of the vessel;
   actuating the solenoid valve;
   drawing water, using the hydraulic pump of the portable hydrotest system, from a water source on the hydraulic path in hydraulic communication with the vessel and the hydraulic pump; wherein the portable hydrotest system comprises hydraulic connections to connect the vessel to the test medium outlet at the output of the hydraulic path;
   opening a shutoff valve disposed along an air flow path to supply compressed air to provide pneumatic power to the hydraulic pump on the hydraulic path;
   wherein opening the shutoff valve further comprises sending a first signal to the shutoff valve to open the shutoff valve;
   pumping the water, using the hydraulic pump, along the hydraulic path, through the pump outlet, the inlet valve, the check valve, the manifold, the outlet valve, and the first port, into the vessel;
   transmitting the pressure measurement data from the pressure transmitter to the controller;
   pressurizing the water within the vessel to the target pressure to form a pressurized water by sending a second signal from the control system to the shutoff valve to close the shutoff valve to stop the hydraulic pump from further pressurizing the water when the pressure measurement data from the pressure transmitter indicate the water is at the target pressure;
   holding, using the check valve, the target pressure within the vessel;
   monitoring, using the monitoring subsystem, the target pressure within the vessel; and
   reducing, using a drain valve in hydraulic communication with the hydraulic path, the target pressure within the vessel.

2. The method of claim 1, wherein:
   drawing the water comprises a filling of the vessel with the water and
   bleeding air displaced by the filling of the vessel.

3. The method of claim 2, wherein:
   bleeding the air displaced by the filling comprises opening an air vent and
   closing the air vent before, when, or after the filling is completed.

4. The method of claim 1, wherein:
   opening the shutoff valve further comprises sending the first signal to the shutoff valve to open the shutoff valve using the control panel.

5. The method of claim 4, wherein:
   sending the first signal to the shutoff valve to open the shutoff valve further comprises using the controller of the control panel.

6. The method of claim 5, wherein monitoring the target pressure within the vessel comprises adjusting the pressure of the pressurized water.

7. The method of claim 6, wherein adjusting the pressure of the pressurized water using the hydraulic pump further comprises sending the first signal from the control system to the shutoff valve to open the shutoff valve to supply the compressed air to the hydraulic pump to further pressurize the pressurized water.

8. The method of claim 6, wherein monitoring the target pressure within the vessel further comprises opening a relief valve to lower the pressure of the pressurized water when the pressure of the pressurized water exceeds the target pressure.

9. The method of claim 1, wherein
holding the target pressure further comprises checking for leaks in the vessel when the pressure transmitter indicates the pressure of the pressurized water has dropped below the target pressure.

10. The method of claim 1, wherein reducing the target pressure within the vessel further comprises opening the drain valve after the target pressure is held for a predetermined amount of time.

11. The method of claim 1 further comprising:
opening the drain valve; and
opening an air vent.

12. The method of claim 1, wherein:
actuating the solenoid valve comprises:
acknowledging, by a testing operator, completion of an interlock step of a plurality of interlock steps by selecting, using the graphical user interface, a text description of the interlock step,
wherein the plurality of interlock steps comprises a CONFIRM_MOTION step, a CONFIRM_HOSES step, or a CONFIRM_AIRFREE step;
wherein the CONFIRM_MOTION step comprises the testing operator installing one or more motion detectors; and
wherein the CONFIRM_HOSES step comprises the testing operator connecting one or more testing hoses;
wherein the CONFIRM_AIRFREE step comprises the testing operator fully filling the vessel with the water.

13. The method of claim 1, further comprising:
draining the hydraulic path using the drain valve,
activating, by the control system, an instruction to one or more testing operators to perform a CONFIRM_WATERFREE step to confirm the hydraulic path is drained,
visually checking, by the one or more testing operators, that the hydraulic path is drained, and
acknowledging, by the one or more testing operators, completion of the CONFIRM_WATERFREE step by selecting, using the graphical user interface, a text description of the CONFIRM_WATERFREE step.

14. The method of claim 1, wherein:
drawing the water comprises entering, by a testing operator, a chloride interlock parameter comprising a test medium chloride content below 50 parts per million.

15. A system, the system comprising:
a portable skid:
a solenoid valve located on the portable skid;
a hydraulic pump located on the portable skid, connected to the solenoid valve, and located along a hydraulic path,
wherein a pump outlet of the hydraulic pump is connected to an inlet valve of a manifold;
a check valve located downstream from the hydraulic pump along the hydraulic path,
wherein the manifold comprises the check valve;
a monitoring subsystem comprising a plurality of sensors configured to monitor a vessel during a hydrotest;
a control system comprising a control panel located on the portable skid,
wherein the control system is communicatively coupled to the monitoring subsystem and to the solenoid valve, and
wherein the control panel, having a graphical user interface, is configured to initiate the hydrotest and the hydrotest comprises a target pressure for pressurizing the vessel during a pressurization cycle;
a pressure transmitter connected between the inlet valve and an outlet valve, wherein:
the outlet valve is disposed at an output of the hydraulic path,
a test medium outlet of the outlet valve is connected to a first port of the vessel;
the pressure transmitter is connected to a controller; and
the pressure transmitter is configured to transmit pressure measurement data from the pressure transmitter to the monitoring subsystem;
hydraulic connections to connect the vessel to the output of the hydraulic path;
a water source providing water in hydraulic communication with an input to the hydraulic path; and
a shutoff valve disposed along an air flow path configured to supply compressed air to the hydraulic pump to provide pneumatic power to the hydraulic pump on the hydraulic path,
wherein the control system is configured to send a first signal to the shutoff valve to open and supply air to the hydraulic pump to pressurize the water to form a pressurized water,
wherein the system is configured for pumping the water, using the hydraulic pump, along the hydraulic path, through the pump outlet, the inlet valve, the check valve, the manifold, the outlet valve, and the first port, into the vessel;
wherein the control system is configured to send a second signal to the shutoff valve to close the shutoff valve to stop the hydraulic pump from further pressurizing the water when the pressure measurement data transmitted from the pressure transmitter to the controller indicate the water is at the target pressure,
wherein the check valve is configured to hold at the target pressure the pressurized water within the vessel, and
wherein the monitoring subsystem is configured to monitor the hydraulic pump, the solenoid valve, and the target pressure.

16. The system of claim 15, further comprising:
a drain valve in hydraulic communication with the hydraulic path, configured to reduce the pressure within the vessel.

17. The system of claim 16, wherein:
the drain valve further comprises a drain valve actuator, and
the drain valve actuator is communicably coupled to the controller to activate the drain valve actuator.

18. The system of claim 16, wherein:
the drain valve is configured to drain the hydraulic path,
the control system is configured to activate an instruction to one or more testing operators to perform a CONFIRM_WATERFREE step to confirm the system is drained, the system is configured for visually checking, by the one or more testing operators, that the system is drained, and the system is configured to obtain from the one or more testing operators an acknowledgment of completion of the CONFIRM_WATERFREE step;

wherein the acknowledgment is obtained by the one or more testing operators visually checking the system is drained, and selecting, using the graphical user interface, a text description of the CONFIRM_WATERFREE step.

19. The system of claim 15, wherein:

the graphical user interface is configured for displaying a plurality of interlock steps;

the system is configured to send the first signal to the shutoff valve to open after obtaining an acknowledgment by a testing operator of an interlock step of the plurality of interlock steps, and wherein the acknowledgment is obtained by the testing operator selecting, using the graphical user interface, a text description of the interlock step, wherein the plurality of interlock steps comprises a CONFIRM_MOTION step, a CONFIRM_HOSES step, or a CONFIRM_AIRFREE step;

wherein the CONFIRM_MOTION step comprises the testing operator installing one or more motion detectors; and wherein the CONFIRM_HOSES step comprises the testing operator connecting one or more testing hoses;

wherein the CONFIRM_AIRFREE step comprises the testing operator fully filling the vessel with the water.

20. The system of claim 15, wherein:

pressurizing the water comprises entering, by a testing operator using an input interface, a chloride interlock parameter comprising a test medium chloride content below 50 parts per million.

* * * * *